(12) United States Patent
Haller (10) Patent No.: US 10,305,222 B2
(45) Date of Patent: May 28, 2019

(54) CONNECTOR ASSEMBLY (71) Applicant: HUBER+SUHNER AG, Herisau (CH)

(72) Inventor: David Haller, Beringen (CH)

(73) Assignee: HUBER+SUHNER AG, Herisau (CH)

(*) Notice: Subject to any disclaimer, the term of this patent is extended or adjusted under 35 U.S.C. 154(b) by 0 days.

(21) Appl. No.: 15/526,253

(22) PCT Filed: Oct. 29, 2015

(86) PCT No.: PCT/EP2015/075116
§ 371 (c)(1),
(2) Date: May 11, 2017

(87) PCT Pub. No.: WO2016/074938
PCT Pub. Date: May 19, 2016

(65) Prior Publication Data
US 2017/0338590 A1 Nov. 23, 2017

(30) Foreign Application Priority Data

Nov. 11, 2014 (CH) .................................. 1747/14
May 29, 2015 (CH) .................................. 768/15

(51) Int. Cl.
G02B 6/38 (2006.01)
H01R 13/627 (2006.01)

(52) U.S. Cl.
CPC ....... *H01R 13/6275* (2013.01); *G02B 6/3821* (2013.01); *G02B 6/3893* (2013.01); *G02B 6/3878* (2013.01)

(58) Field of Classification Search
CPC .. G02B 6/3893; G02B 6/3879; G02B 6/3895; G02B 6/3821
See application file for complete search history.

(56) References Cited

U.S. PATENT DOCUMENTS 6,276,839 B1 8/2001 De Marchi
6,561,699 B1 * 5/2003 De Marchi .......... G02B 6/3825
385/58

(Continued)

FOREIGN PATENT DOCUMENTS

DE 10 2010 010018 A1 9/2011
EP 0 916 978 A1 5/1999

(Continued)

OTHER PUBLICATIONS

Chinese Patent Office, First Notification of Office Action, Chinese Patent Application No. 201580067120.6, dated Aug. 1, 2018 (12 pages).

*Primary Examiner* — Thomas A Hollweg
*Assistant Examiner* — Mary A El-Shammaa
(74) *Attorney, Agent, or Firm* — Pauley Erickson & Kottis (57) ABSTRACT

A connector assembly (1) including a first connector unit (2) and a second connector unit (3) interconnectable with respect to each other. The first connector unit (2) includes at least one connector (5) arranged at least partially inside a plug housing (4). The at least one connector (5) is operatively connected to the plug housing (4) by a latching mechanism (7) which provides an engaged configuration in which the at least one connector (5) is latched with respect to the plug housing (4) and a disengaged configuration in which the at least one connector (5) is disengaged from the plug housing (4).

10 Claims, 7 Drawing Sheets (56) References Cited

U.S. PATENT DOCUMENTS

| | | |
|---|---|---|
| 8,272,790 B2 | 9/2012 | Belsan et al. |
| 8,408,810 B2 | 4/2013 | Hoffmann et al. |
| 2005/0069264 A1 | 3/2005 | Luther et al. |

FOREIGN PATENT DOCUMENTS

| | | |
|---|---|---|
| EP | 1 443 350 A2 | 8/2004 |
| EP | 1 744 408 A1 | 1/2007 |
| WO | WO 2009/135787 A1 | 11/2009 |

* cited by examiner

CONNECTOR ASSEMBLY

BACKGROUND OF THE INVENTION

Field of the Invention

The present invention relates to a connector assembly for self-latching connectors, in particular for outdoor applications.

Discussion of Related Art

Reliable interconnections of optical/electrical connectors with mating sockets of corresponding interfaces play an important role for example in communication and network systems. The interconnection should ensure sufficient optical/electrical contact between the connector and the socket in order to minimize signal loss and to increase efficiency. For optical connectors this is achieved by a pre-biased spring in the housing of the connector unit, pressing the ferrules with a predetermined axial force against each other. It is furthermore desirable that these issues can be fulfilled together with connector elements where manufacture-related tolerances can be compensated for by the connector.

Furthermore, the connectors are often applied outdoors, e.g. with remote radio heads (RRH) in base stations for mobile communication, where they are exposed to environmental factors, such as pollution, moisture etc. Thus, a proper sealing of the connection between the connector and the interface is required to ensure durability and reliability of the connection. Depending on the circumstances, a person installing such connections may be situated in an uncomfortable and unstable position, for example towards the top of an antenna mast, making a simple and reliable plugging mechanism of the connector desirable.

U.S. Pat. No. 8,408,810 B2 assigned to Harting Electronics GmbH was first published in September 2010 (U52010220959 AA). It describes a cable connector assembly comprising optical connectors (so called LC-connectors) on the inside. Two optical waveguides are respectively terminated in a LC-connector in a spring-loaded fashion in individual ferrules and can be axially displaced independently of one another. The LC-connectors are also arranged in a sliding housing that is arranged within a surrounding connector housing such that it can be axially displaced by a certain supplementary travel in a spring-loaded fashion. One aim is to compensate manufacturing-related dimensional tolerances between the ferrule housings and the optoelectric receivers in a mating connector or another adapter.

U.S. Pat. No. 8,272,790 B2 assigned to Amphenol Fiber Optics and Amphenol Corporation was first published in May 2011 (US2011123157 AA). It describes a cable connector assembly for outdoor connection to transceivers. An optical cable connector is coupled to a transceiver such that a biasing force generated within the cable connector assembly holds the transceiver in a mating relationship with a connector within an electronic assembly. On a long term base the biasing force may be too large when the connector is plugged and tolerances may not be compensated for sufficiently. As in the mated position the biasing force constantly acts upon the counterpart this may cause damage to the holding means of the counterpart such as e.g. solder connections.

It is therefore an object of the present invention to improve the state of the art of connecting a connector to an interface by providing a connector assembly which is easily connectable with the interface and which ensures reliable and durable connection of the connector assembly with the interface.

SUMMARY OF THE INVENTION

In outdoor applications, the circumstances of establishing connections between connectors and interfaces can be cumbersome, for example due to the location and reduced accessibility of the interface, e.g. on top of an antenna mast. Therefore, there is a need of a connector assembly comprising a first connector unit (plug) and a second connector unit (socket). Normally the plug is foreseen to receive at least one connector, preferably a self-locking optical connector, e.g. in the form of a so called LC-connector. One aspect of the invention is to provide a connector assembly which avoids overloading of the connector and other parts arranged inside or interconnected to the connector assembly, such as e.g. solder connections arranged inside an RRH. It should be understood that although hereinafter the invention is described in view of optical connectors the invention is suitable to be used in connection with any other kind of connectors, namely those which interlock with an interface in a mated position. Beside LC, examples for such connectors are RJ45, LX.5, SC or E2000.

In an embodiment of the invention this is achieved in that preferably the plug comprises a latching mechanism which operatively interconnects directly or indirectly a plug housing (by which the plug is preferably handled) and the at least one optical connector which is arranged movable in an axial direction (mating direction) with respect to the plug housing when in a disengaged configuration as described hereinafter.

The latching mechanism is providing an engaged configuration and a disengaged configuration wherein a predefined first force level has to be overcome to switch from the engaged configuration to the disengaged configuration. Furthermore in the engaged configuration the at least one optical connector is mechanically interconnected to the plug housing such that when the plug housing is displaced in axial direction the at least one optical connector is displaced accordingly. In the disengaged configuration the at least one optical connector can be moved freely or if appropriate against the force of a spring element with respect to the plug housing in a defined manner. Thereby the connector assembly according to the herein disclosed invention allows to easily establish a reliable connection between the at least one optical connector and a connector interface by requiring only a few and simple manual actions of the user applying the connector assembly.

In the engaged position when the at least one optical connector is interconnected to and interlocked with the connector interface, the at least one optical connector is disengaged from the plug housing and thereby no negative residual forces act upon it. Compared to the prior art the connector assembly ensures sufficient force and guidance during mating of the at least one optical connector and a thereto related connector interface. At the same time, the connector assembly is designed that the load used for secure mating is removed or significantly reduced from the optical connector after it is interlocked with the connector interface, as in the engaged configuration the at least one optical connector is normally latched itself to the connector interface.

In principle the latching mechanism interconnecting the plug housing and the at least one optical connector comprises at least one latching element arranged at or interconnected to the plug housing and at least one counter latching element arranged at or interconnected to the at least one optical connector (or vice-versa-hence alternatively or in addition at least one latching element may be arranged at or interconnected to the at least one optical connector and at least one counter latching element may be arranged at or interconnected to the plug housing). In an embodiment the counter latching element is interconnected to a displacement unit foreseen to hold one or several optical connectors. The at least one latching element and the at least one counter latching element are latchable with each other wherein—as previously mentioned—a first force level has to be overcome to bring the latching mechanism from the engaged to the disengaged configuration. On the other hand a second force level has to be overcome to return the latching mechanism from the disengaged to the engaged configuration.

In an embodiment the latching element is formed by a protrusion (latch) and the counter latching element comprises at least one recess suitable to receive the latch. In the engaged configuration the latch is arranged in the recess and in the disengaged configuration the latch is arranged outside of the recess. The latch and/or the recess are arranged displaceable in a transversal direction in an elastic manner, e.g. against the force of a spring having a certain spring rate. A first ramp having a first slope can be foreseen to define the first force level necessary to disengage the latch from the recess, respectively the latching element from the counter latching element. Hence the recess may comprise (respectively may be partially defined by) a first ramp that defines a protrusion which interacts as a counter-latch with the latch. A second ramp having a second slope being arranged in operating direction opposite to the first ramp and having therewith the same point of culmination can be foreseen to define the second force level which is necessary to bring back the latching mechanism from the disengaged into the engaged configuration. If appropriate an additional spring element can be foreseen which functionally is arranged between the plug housing and the at least one optical connector. The spring element can be arranged at or integrated into the latching mechanism. E.g. it can be arranged parallel or in series, resp. coaxial to the latching mechanism. The spring element is compressed during the mating movement of the connector assembly, namely when the latching mechanism disengages (switches from the engaged into the disengaged configuration). The spring element is normally foreseen to store a certain amount of energy which helps to re-engage the latching mechanism (to switch the latching mechanism from the disengaged to the engaged configuration) when disengaging the first connector unit from the second connector unit. The spring element may ensure proper alignment of the displacement unit relative to the plug housing by providing a position-dependent displacement resistance in the disengaged configuration. The spring element may further contribute to the predefined first force level pushing for example the at least one protrusion (latch) into the at least one recess. In the mated position of the connector assembly when the at least one optical connector on the inside of the connector assembly is interconnected to its counterpart and interlocked thereto by its own locking device, the spring element is normally not providing any relevant contribution to the force necessary to provide interconnection to the optical fibers of the at least one optical connector. Said force is preferably generated by the at least one optical connector itself which is latched to its counterpart.

Good results can be achieved when the latching and/or the counter latching element of the latching mechanism are arranged on at least one lever. The at least one lever being itself elastically deformable and/or being arranged in a deflectable manner, e.g. around a hinge axis. The at least one lever may with one end be fixed to a support, such as to an additional body of the displacement unit or to the displacement unit itself or to an additional body of the plug housing or to the plug housing itself, and with the other end being elastically spatially deflectable.

In a variation of the invention the latching element is formed by one protrusion or multiple protrusions (latch) and the counter latching element comprises at least one protrusion (counter-latch) to interact with the latch. Good results may be obtained if the latch or the counter-latch or both have a sawtooth shape, having a ramp face (ramp portion) and a flyback face (drop/flyback portion). In the engaged configuration the latch and the counter-latch are arranged such that the flyback portion of the latch can interact with the ramp of the counter-latch and in the disengaged configuration the ramp face of the latch can interact with the ramp face of the counter latch. In other words one can also say that the engaged configuration, the latch is located in a recess with respect to the counter-latch. The counter-latch is arranged displaceable in an axial as well as in a transversal direction in an elastic manner. Therefore the counter-latch may be arranged at (or be part of) a lever having a certain spring rate (or certain spring rates in axial and/or transversal direction). The counter-latch and/or the lever may be integrally formed with a displacement unit foreseen to hold one or several optical connectors. The displacement unit may comprise a counter bearing element (support, abutment) which has at least one ramp the can interact with at least one ramp face of at least one counter-latch. In the engaged configuration, the latch can be moved relative towards the displacement unit, leading to an interaction of the flyback portion of the latch element and the flyback portion (frontal face) of the counter-latch, causing a displacement/deflection of the counter-latch in transversal direction relative to the counter bearing element and hence a deformation of the lever. The at least one ramp of the counter bearing element causes a transversal displacement of the counter-latch when the counter-latch is displaced in transversal direction. At a certain degree of transversal displacement, the at least one latch and counter-latch disengage and thus the lever becomes unloaded and rebounces to a non-deformed shape. Hence the lever and the slope of the counter bearing element are foreseen to define the first force level necessary to disengage the latch from the counter-latch, respectively the latching element from the counter latching element. In disengaged configuration, a ramp portion of the latch and/or a ramp portion of the counter-latch may be arranged such that the latching mechanism can be brought back from the disengaged into the engaged configuration with a predefined second force, as is explained above and in further detail below.

Good results may be obtained with latches that have a sawtooh shape, as such latches normally allow easy switching from the disengaged to the engaged con-figuration. The protrusion of the latching element may also have essentially the shape of a square wave. Protrusions with a sawtooth or square wave shape may be advantageous for certain applications because they allow the counter latching element to be unloaded when in the disengaged configuration. Thus, creeping effects can be prevented and longevity of the latching mechanism can be obtained. Alternatively, a protrusion may be a step, leading from a lower level (where the counter latching element is in an engaged configuration not displaced in transversal direction) to a higher level, where the latching element is in a disengaged configuration displaced in transversal direction. In such a variation of the invention, the lower level may be regarded as a recess. The at least one optical connector (plug connector) is preferably of a type as described in WO 09/135787A1 assigned to the same applicant. It describes an LC-connector having an improved locking, resp. unlocking mechanism. A locking arm protrudes toward the back of the connector body in a slanted manner. When inserting the connector into a corresponding interface the locking arm is pressed down and locks with the housing of the socket automatically. The locking arm is operatively connected to a collar by way of a bracket. By displacing the collar in an unlocking direction, the connector can easily be unlocked and removed from the interface by pulling on the collar. The locking arm is foreseen to securely lock the optical connector with respect to a corresponding interface in an engaged position such that the end faces of the (normally spring loaded) ferrules of the optical connector and its counterpart are securely mated. The optical connector is having a base body and an articulated locking arm, which is integrally formed on the front end of the base body and protrudes obliquely toward the rear. Furthermore the optical connector comprises an unlocking element which is operatively connected to the locking arm and is displaceable in an unlocking direction in relation to the base body such that the locking arm is unlocked. The unlocking element has a displacement element which is displaceable in the unlocking direction and is normally operatively connected to the base body. The optical connector can be unlocked by moving the displacement element in an unlocking direction.

Usually, the first connector unit, respectively the thereto arranged at least one optical connector, is configured to disconnect at a mechanical unplugging resistance being above the second force level. Thereby it is achieved that the latching mechanism is returned from the disengaged to the engaged configuration before the optical connectors are disconnected from their interface. In addition the connector unit, respectively the thereto arranged at least one optical connector, is configured to connect at a mechanical plugging resistance being below the first force level. Thereby it is made sure that the at least one optical connector is safely connected before the latching mechanism disengages.

The position-dependent displacement resistance of the spring element mentioned above is normally significantly smaller than the spring force (of the at least one optical connector) by which the ferrules are pressed against each other. Thereby the connector units are not pressed with a force exceeding the ferrule spring, force against the connector interface. The mating position of the ferrule of the optical connector and its counterpart (interface) are thereby defined by the interaction between the at least one optical connector and the thereto related interface only. Compared to the prior art the optimum force level is not exceeded.

Now turning to a preferred outer configuration of a connector assembly according to the present invention. When using the connector assembly in a harsh environment the first connector unit and the second connector unit should be configured to form a sealed connection between each other. In addition locking means are foreseen to mechanically interconnect to the first and the second connector unit with respect to each other.

When coupling a first and a second connector unit with respect to each other normally the following steps are executed: Providing a first and a second connector unit. If not yet done, engaging the latching mechanism. Plugging the first connector unit (plug) into the second connector unit (socket) by moving the plug housing towards the housing of the socket until the latching mechanism is disengaged. Locking the first with respect to the second connector unit by the locking means.

During unplugging normally the following steps are executed. In a first step the first connector unit is disengaged from the second connector unit. Then the connector housing is moved in opposite direction until the latching mechanism is engaged again. The movement is then continued until the at least one optical connector is disengaged from its mating interface.

BRIEF DESCRIPTION OF SEVERAL VIEWS OF THE DRAWINGS

The herein described invention will be more fully understood from the detailed description given herein below and the accompanying drawings, which should not be considered limiting to the invention described in the appended claims. The drawings are showing:

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
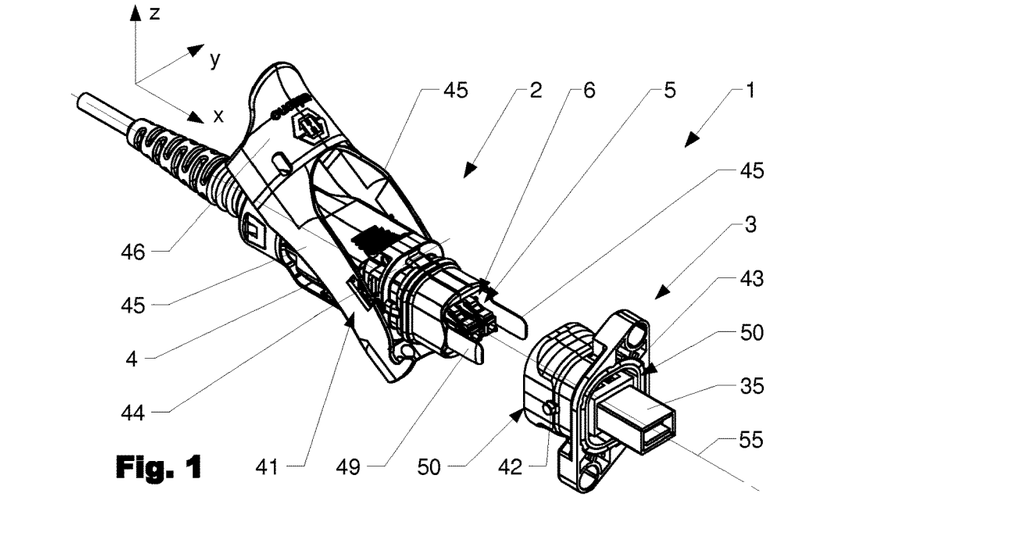
FIG. 1 shows a first embodiment of a connector assembly comprising a first and a second connector unit in a perspective view before engaging.
Figure 2:
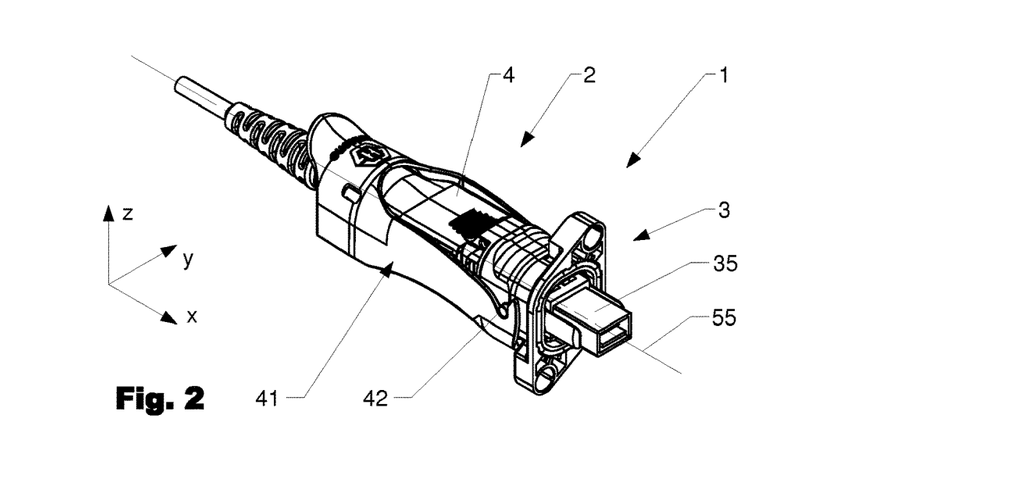
FIG. 2 shows the connector assembly according to FIG. 1 after engaging of the connector units.
Figure 3:
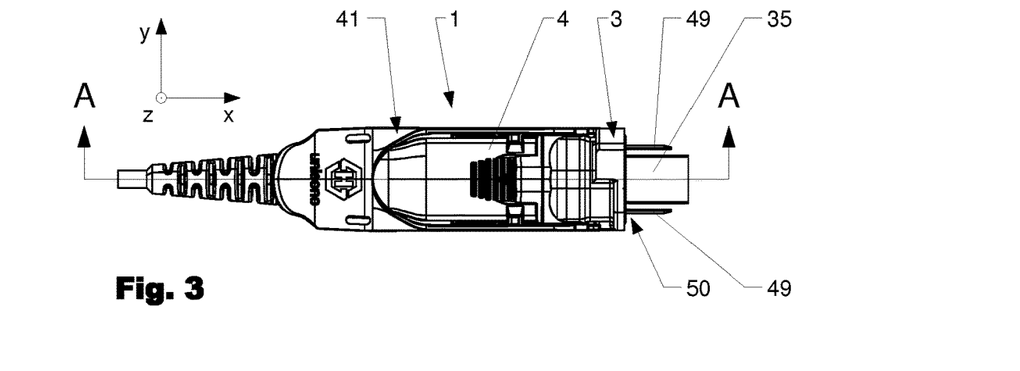
FIG. 3 shows a top view of the connector assembly 1.
Figure 4:
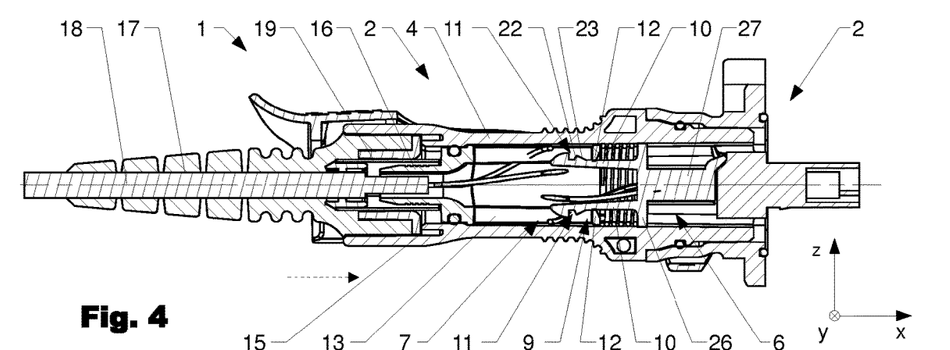
FIG. 4 shows a section view of the connector assembly along section line AA according to FIG. 3.
Figure 5:
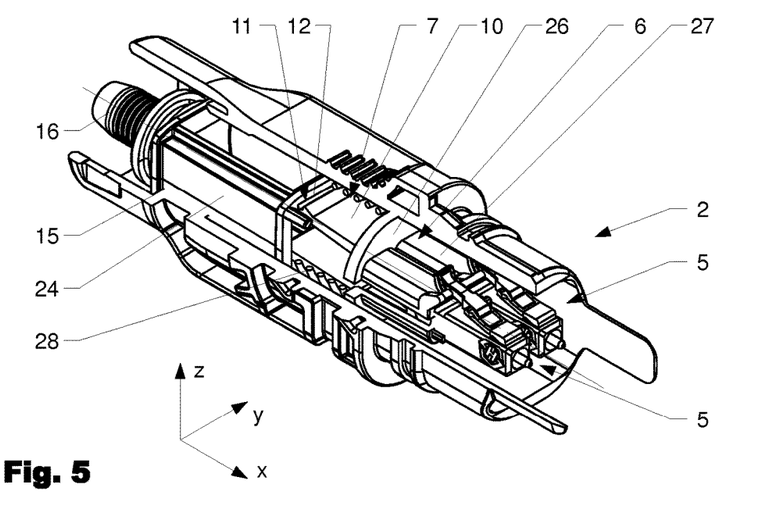
FIG. 5 shows a part of the connector assembly according to FIG. 4 in a perspective view and partially cut.

FIGS. 1 to 12 show a first embodiment of a connector assembly, whereby FIGS. 13 to 20 show a second embodiment of a connector assembly. FIG. 1 and FIG. 2 show a perspective view of a connector assembly 1 comprising a first connector unit 2 (hereinafter plug) and a second connector unit 3 (hereinafter socket). In FIG. 1 the plug 2 and the socket 3 are shown in an unplugged position. FIG. 2 shows the plug 2 and the socket 3 plugged with respect to each other. FIG. 3 shows the plug 2 and the socket 3 in a top view and FIG. 4 shows a section view along section line AA according to FIG. 3. FIG. 5 shows the first connector unit 2 in a perspective view and partially cut for illustrative purposes such that the inside becomes better apparent.

As visible in FIGS. 1 and 2 the plug 2 comprises first locking means 41 which are in an engaged position of the connector units 2, 3 interlockable to second locking means 42 arranged at a socket housing 43 of the second connector unit 3. Good results are achieved when—as shown—the first locking means 41 are directly interconnected to the socket housing 43, e.g. in the form of a lug 41, which is pivotable about a swivel axis 44. In the shown embodiment the lug 41 comprises a first and a second arm 45 which are interconnected by a lever 46. The lug is made out of a durable material, such as metal or plastic and is arranged pivotable on two pivot pins arranged opposite to each other forming the swivel axis 44. The lug comprises on each side a heel 47 which the locking pins 42 arranged at a second connector unit 3. Alternatively or in addition, other locking means can be foreseen, such as screw or bayonet connections, to mechanically interlock the first and the second connector unit 2, 3 in a secure manner. However, one disadvantage may be that such type of locking means needs significantly more space especially in lateral (transversal) direction. Between the plug housing 8 and the socket housing 43 of the socket 3 normally at least one seal 48 is arranged to tightly seal the connector assembly 1 against environmental factors, such as pollution, moisture etc.

In the plug housing 4 of the plug 2 two connectors 5 are arranged adjacent to each other. In the present example the connectors 5 are self-locking optical LC-connectors which are arranged in a duplex configuration. However it should be noted that the invention is suitable for any other kind of connectors. As e.g. visible in FIG. 5 the connectors 5 are attached by a holder 27 to a displacement unit 6 laterally next to each other. The displacement unit 6 is interconnected by a latching mechanism 7 to the plug housing 4. The same essentially holds true for the variation shown in FIGS. 13 to 20.

Preferably at least one of the housings 4, 49 comprises at least one first aligning means 49 which engage with corresponding second aligning means 50 to precisely align the first and the second connector unit 2, 3 with respect to each other before the at least one connector 5 are engaged with their counterpart as described hereinafter. In the shown embodiment the first guiding means 49 are two guides 49 which can be inserted in axial direction (x-direction) in corresponding openings arranged at the socket housing 43.

The latching mechanism 7 of the first variation of a connector assembly 1 is arranged inside the plug housing 4 and consists in the shown embodiment of two latching elements 8 which interact with two counter latching elements 9. The counter latching elements 9 of the first variation each consist of an elastic lever 10 being laterally (transversally) (z-direction) deflectable at a certain spring rate and which comprise at their end a recess 11. The latching elements 8 are each formed by a protruding edge 12 (latch) of a cage body 13. The cage body 13 is inserted into a throughout opening 14 of the plug housing 4 from a rear (cable sided end) up to a shoulder 15. The cage body comprises at its rear end a crimp neck 16 to which an outer jacked 17 of a cable 18 is attached by a crimp sleeve 19. The cage body 13 is fixed in the plug housing 4 by a clamp 20 which is then encapsulated by a casted bend protection 21 surrounding the cable 18.

The latching mechanism 7 of the second variation of a connector assembly 1 as shown in FIGS. 13 to 20 is also arranged inside the plug housing 4 and consists in the shown embodiment of two latching elements 8 which interact with two counter latching elements 9. The counter latching elements 9 of the second variation each consist of an elastic lever 10 being transversally (y-direction) deflectable at a certain spring rate as well as axially (x-direction) compressible at a certain spring rate. Therefore the elastic levers 10 comprise sections that act like springs 28 which allows them to be deflected, respectively deformed in transversal and axial direction (in the x/y-plane). At their end, the levers 10 each comprise two counter-latches 51. The latching elements 8 are each formed by protruding edges 12 (latch) arranged at stringers 24. The stringers 24 are arranged at a (first) base 25.

The displacement unit 6 is arranged displaceable in axial direction (x-direction) with respect to the plug housing 4 such that the latching elements 8 (edges 12) and the corresponding counter latching elements 9 (recesses 11 of the first variation, respectively counter-latches 51 of the second variation) can be engaged and disengaged inside the plug housing 4.

For the first variation as shown in FIGS. 1 to 12, on the side of the elastic lever 10 (inner side) the recess 11 is delimited by a first ramp 22 having a first slope. The first ramp 22 merges into a second ramp 23 which is arranged opposite to the first ramp and has a second slope, as e.g. shown in FIG. 10. Hence the first and second ramp 22, 23 define a protrusion that can be regarded as a counter-latch which interacts with the latch 12. In the shown embodiment of the first variation the first and the second ramp 22, 23 have the same point of culmination. The first ramp 22 arranged at the elastic lever 10 interacts with the latch 12 arranged at the cage body 13. The first ramp 22 defines in connection with the spring rate of the elastic lever 10 a first force level which has to be at least applied in axial direction (x-direction) to disengage the latch 12 from the recess 11. On the other hand a second force level is defined by the second ramp 23 and the spring rate of the elastic lever 10 to return the latch 12 from the disengaged configuration (as e.g. shown in FIG. 4) to the recess 11, respectively to the engaged configuration.

Figure 14:
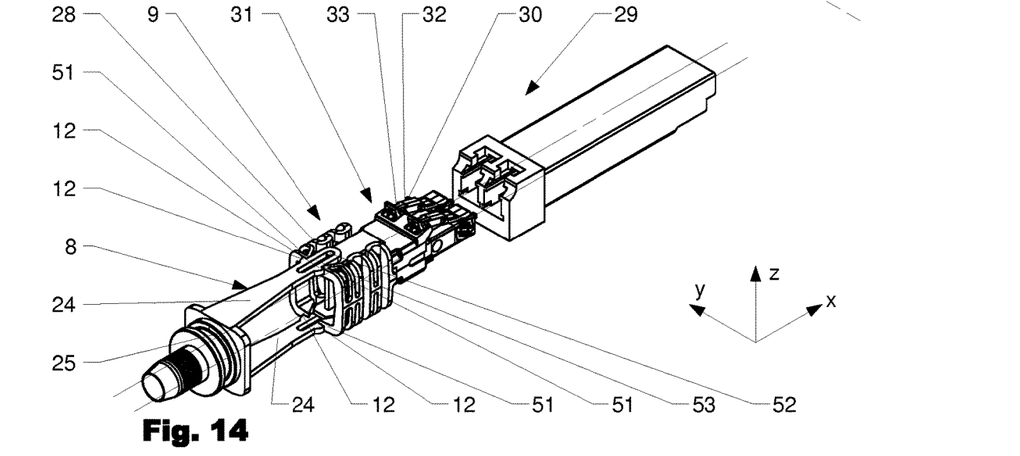
FIG. 14 a part of the connector assembly according to FIG. 13 in a perspective view.
Figure 18:
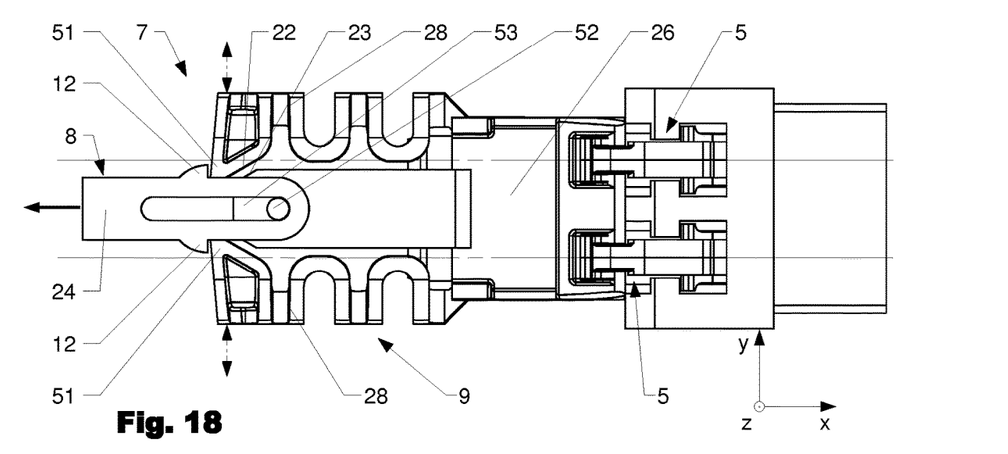
FIG. 18 shows a step in latching and unlatching of a second latching mechanism arranged inside one of the connector units of the connector assembly.
Figure 19:
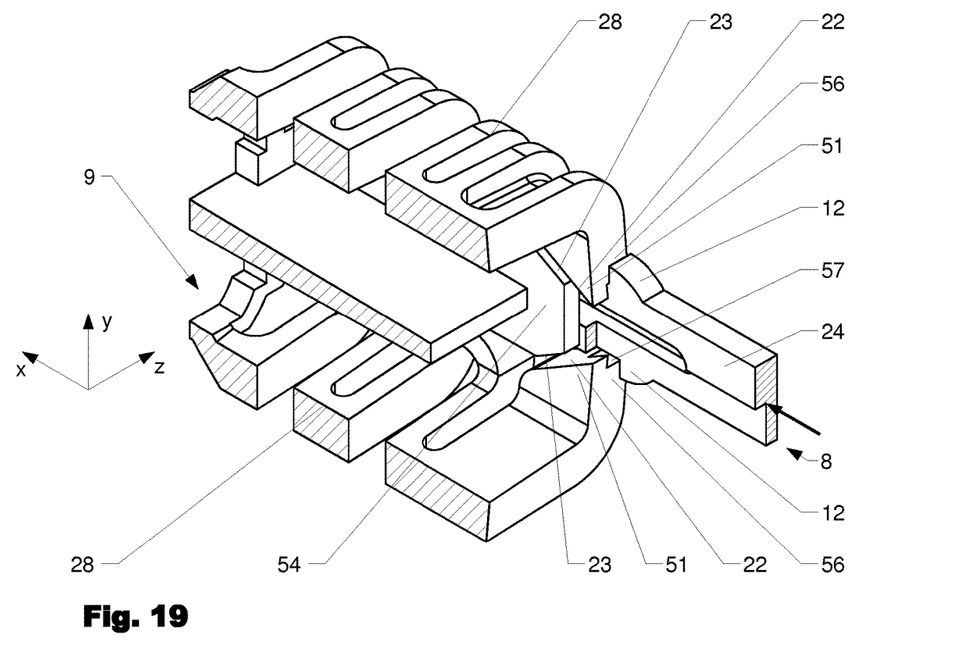
FIG. 19 shows a step in latching of the second latching mechanism in another view and partially cut.
Figure 20:
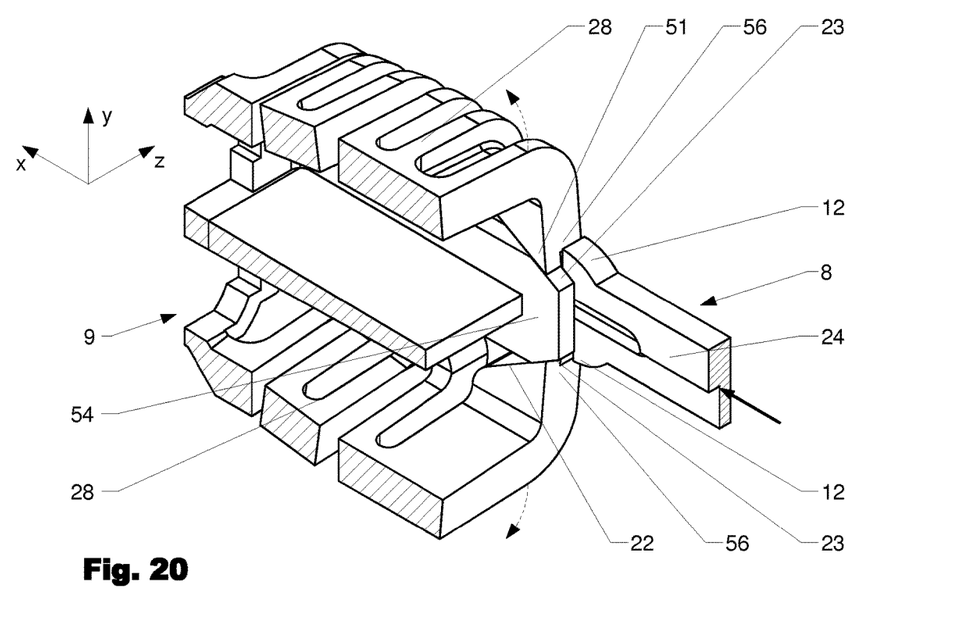
FIG. 20 shows a step in latching of the second latching mechanism in another view and partially cut.

For the second variation as shown in FIGS. 13 to 20, in the side of the elastic lever 10 the counter-latches 51 comprise a first ramp 22 having a first slope, as e.g. shown in FIGS. 14, 19 and 20. As well the counter latching element 9 comprises a counter bearing element 54 with second ramps 23 having second slopes. The latches 12 of the embodiment shown have a sawtooth shape, comprising a ramp portion with a slope and a flyback portion, which in the embodiment shown is essentially parallel to the y/z-plane. The flyback portion of each latch 12 interacts with a dedicated frontal face 56 of the counter-latches 51 in order to apply a force in axial direction (x-direction). The first and second ramps 22, 23 can interact with each other and define in connection with the spring rates of the elastic lever 10 a first force level which has to be at least applied in axial direction (x-direction) to disengage the latches 12 from the counter latches 51. On the other hand a second force level is defined by the first ramp 22 and the ramp portion of the sawtooth shaped latch 12 and the spring rate of the elastic lever 10 to return the latch 12 from the disengaged configuration to the engaged configuration.

Figure 6:
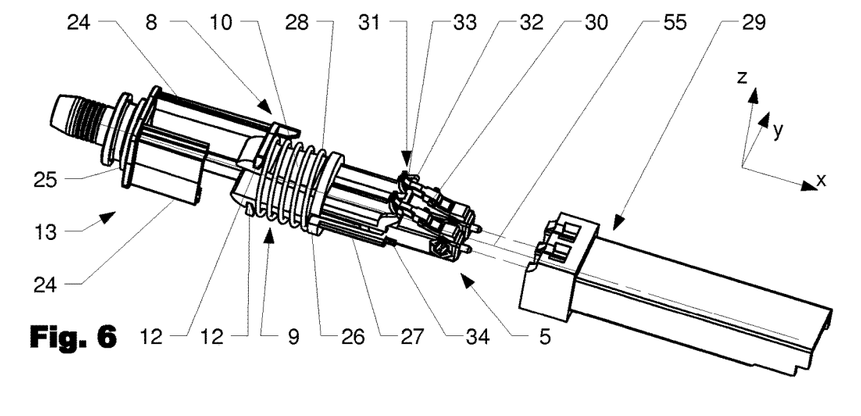
FIG. 6 shows a part of the connector assembly according to FIG. 5 in a perspective view.

As visible in FIG. 6 the cage body 13 of the first variation comprises two stringers 24 which extend from a (first) base 25 to which at the rear end the crimp neck 16 is attached. At the opposite end the stringers 24 merge into the latches 12. The same essentially holds true for the variation shown in FIGS. 13 to 20 where each stringer 24 merges into two latches 12, as shown in FIG. 14. In FIG. 6 for better visibility a section of the stringer 24 laying in the foreground has been cut away such that the latch 12 and the recess 11, which are shown here in an engaged position, become visible. The displacement unit 6 comprises a (second) base 26 to which on one side a holder 27 for the at least one connector 5 is attached. On the opposite side the base 26 merges into the levers 10 which carry the recesses 11 at their ends.

In the embodiment shown in FIGS. 1 to 12 a helical spring 28 (spring element) is arranged between the latch 12 and the base 26 of the cage body 13. Alternative arrangements are possible. E.g. it can be arranged parallel or in series, resp. coaxial to the latching mechanism 7. The spring 28 is compressed during the mating movement of the connector assembly, namely when the latch 12 disengages from the recess 11 as will be described hereinafter in more detail. The spring 28 is normally foreseen to store a certain amount of energy which helps to re-engage the latching mechanism 7, i.e. to switch the latching mechanism 7 from the disengaged to the engaged configuration. This normally takes place when disengaging the first connector unit 2 from the second connector unit 3. In the mated position of the connector assembly 1 when the at least one optical connector 5 is interconnected to its counterpart (e.g. SFP-module or any other suitable adapter) and interlocked thereto by its own locking device. Normally the spring 28 is not providing any relevant contribution to the force necessary to provide interconnection of e.g. the optical fibers of the at least one optical connector 5. Said force is normally generated by the at least one optical connector 5 itself.

The latching elements 8 and the counter latching elements 9 are arranged symmetrically with respect to the longitudinal connector assembly axis 55, such that the occurring forces during engaging and disengaging of the latching mechanism 7 are distributed symmetrically on the latching elements 8 and the counter latching elements 9.

The connectors 5 each comprise a body 29 which is arranged slidable inside the holder 27 of the displacement unit 6. An articulated locking arm 30 extends from the body 29 and protrudes obliquely toward the rear. An unlocking element 31 arranged at the holder 27 comprises a pin 32 which is operatively connected to the locking arm 30 via a ramp 32 arranged at the rear end of the locking arm 30. The unlocking element 31 is displaceable in the rearward direction in relation to the body 29 of each connector 5. Thereby the pin 32 acts upon the ramp 32 and thereby pushes the rear end of the locking arm 30 in direction of the body 29 such that the locking arm 30 is unlocked from its counterpart (see FIGS. 8-12).

In the opposite direction the movement between the body 29 and the holder 27 is limited by a block 34 arranged at the body 29 and interacting in a forward position with a front edge of the holder 27.

FIGS. 7-10 show different states of a first variation of a connector assembly 1 during plugging the first connector unit (plug) 2 with the second connector unit (socket) 3. For better understanding, certain elements are not shown cut apart. FIGS. 14 to 17 show different states of a second variation of a connector assembly 1 during plugging the first connector unit (plug) 2 with the second connector unit (socket) 3.

Figure 7:
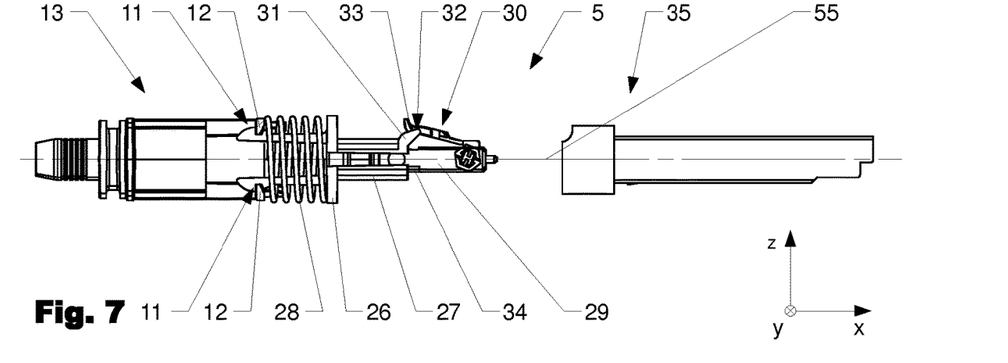
FIG. 7 shows a step in latching and unlatching of a first latching mechanism arranged inside one of the connector units of the connector assembly.
Figure 8:
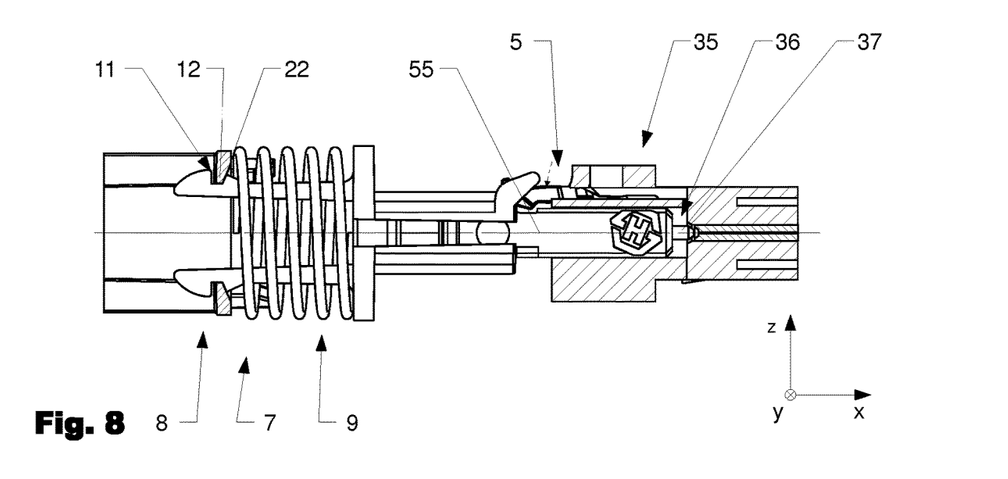
FIG. 8 shows a step in latching and unlatching of a first latching mechanism arranged inside one of the connector units of the connector assembly.
Figure 15:
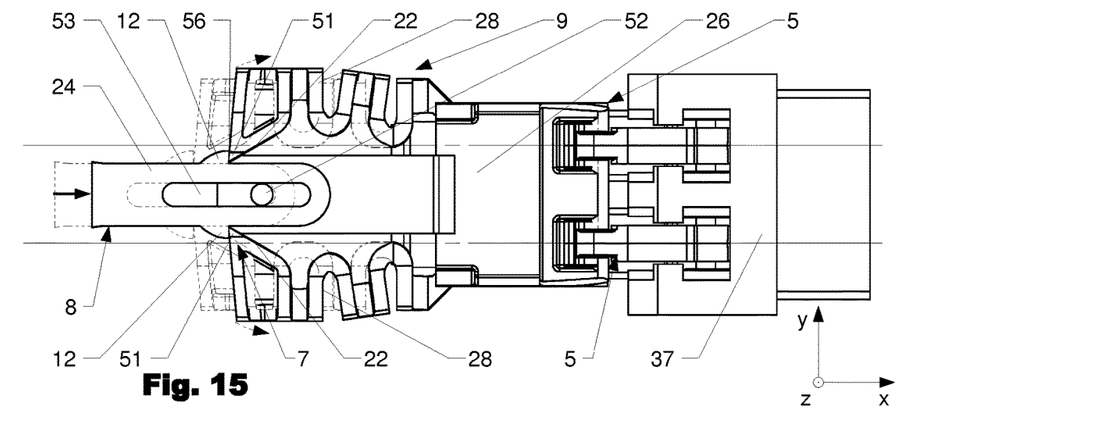
FIG. 15 shows a step in latching and unlatching of a second latching mechanism arranged inside one of the connector units of the connector assembly.

FIG. 7 shows a side view of a part of the connector assembly 1 and a connector interface 35. In the shown embodiment the interface is an SFP-module which normally is inserted into or forms part of the second connector unit 3. The same holds true for the second variation of a connector assembly shown in FIG. 14. In FIG. 7, the latching mechanism 7 of the first variation is in the engaged configuration where the latches 12 are latched with the recesses 11 of the counter latching elements 9. The protrusions forming the edges 12 of the latching elements 8 are held in the recesses 11 of the counter latching elements 9 by the mechanical deflection resistance of the levers 10, the levers 10 being integrally formed with the counter latching elements 9 and—here in addition—by the spring force of the spring element 28, the spring element 28 being a compression spring. Due to the latching of the latching element 8 and the counter latching element 9, the displacement unit 6 is displaced together with the cage body 13 when the first connector unit 2 is moved in axial direction. In FIGS. 14 and 15 the latching mechanism 7 of the second variation is in the engaged configuration where the latches 12 are latched with the counter-latches 51 of the counter latching elements 9. The flyback portions of the latches 12 interact with the frontal faces. The protrusions forming the edges 12 of the latching elements 8 interact with the counter-latches 51 of the counter latching elements 9 by the mechanical deflection resistance of the levers 10, the levers 10 being integrally formed with the counter latching elements 9, comprising spring elements 28 in order to allow deflection in axial (x-direction) as well as transversal (y-direction) direction, as described in further details below. FIG. 8 shows the first variation of a connector assembly 1 according to FIG. 7. The connectors 5 are pushed into a corresponding recess 36 of the connector interface 35 by the latches 12 which act via the first ramp 22 of the recess 11 on the displacement unit 6. Thereby the locking arms 30 are pushed downward. The same mechanism essentially holds true for the second variation of a connector assembly 1, as e.g. shown in FIG. 15, where the connectors 5 are pushed into a corresponding recess 36 of the connector interface 35 by the flyback portions of the latches 12 which interact with the frontal faces 56 of the counter-latches 51 and hence act on the displacement unit 6.

Figure 9:
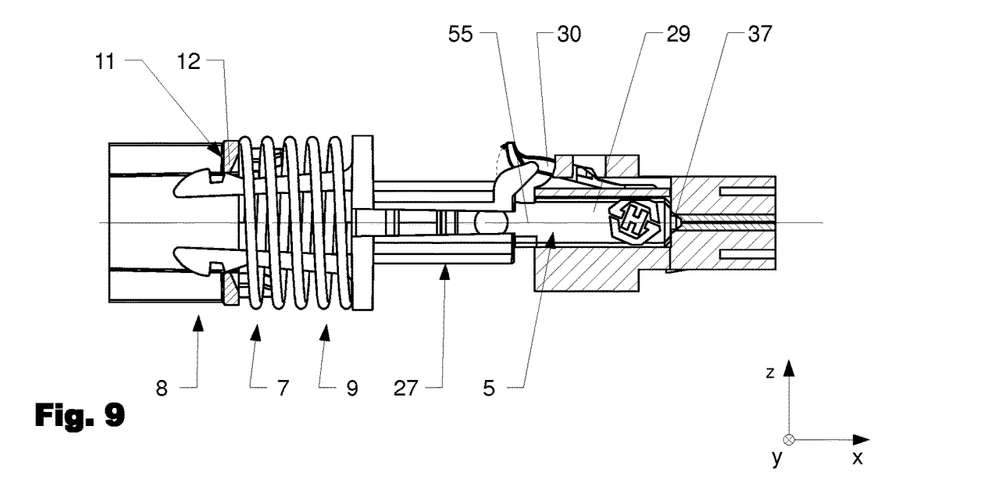
FIG. 9 shows a step in latching and unlatching of a first latching mechanism arranged inside one of the connector units of the connector assembly.
Figure 10:
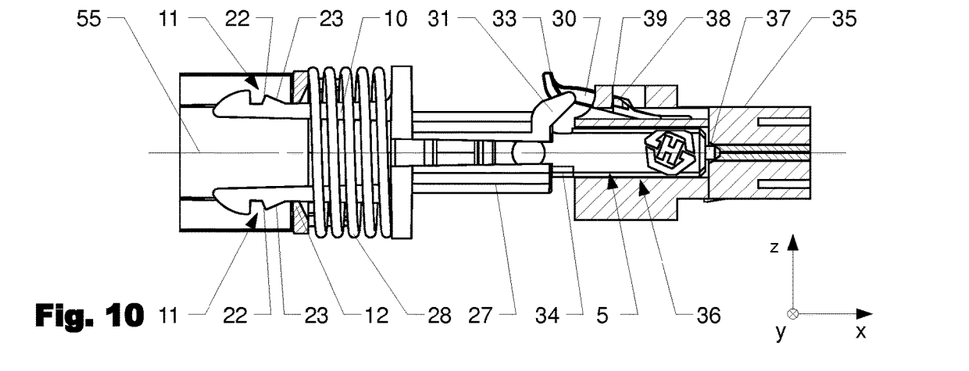
FIG. 10 shows a step in latching and unlatching of a first latching mechanism arranged inside one of the connector units of the connector assembly.
Figure 16:
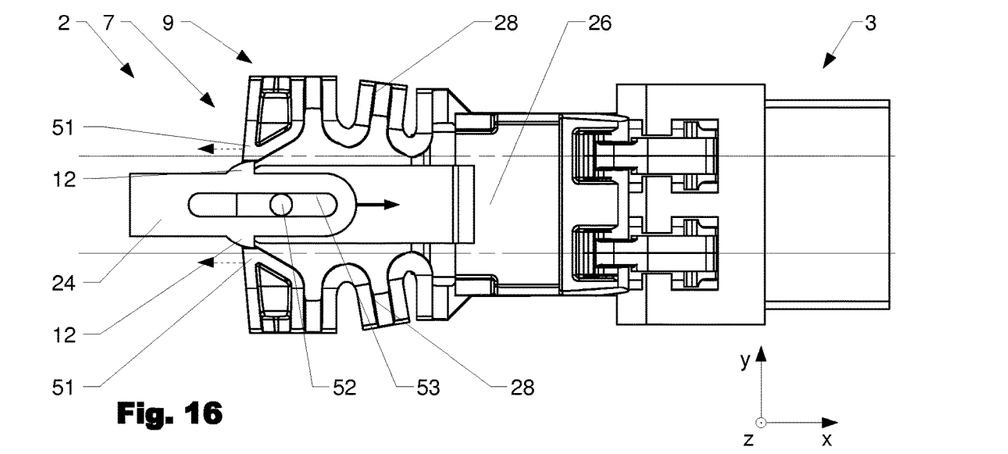
FIG. 16 shows a step in latching and unlatching of a second latching mechanism arranged inside one of the connector units of the connector assembly.
Figure 17:
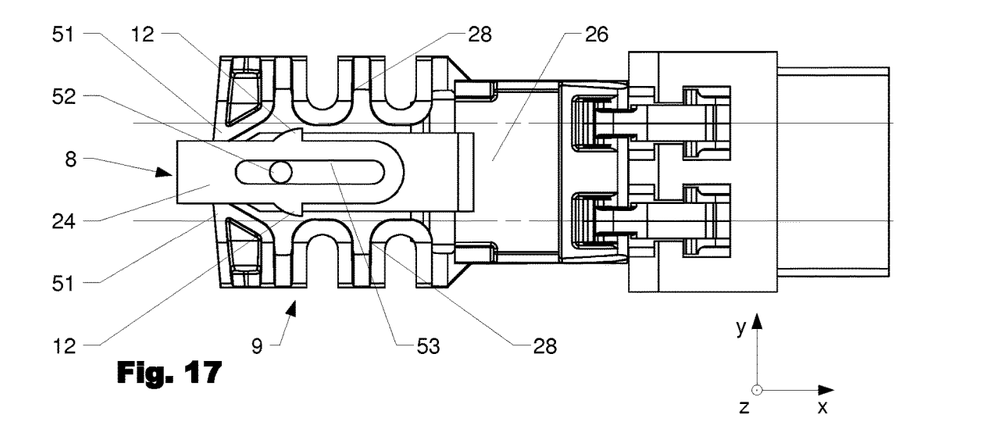
FIG. 17 shows a step in latching and unlatching of a second latching mechanism arranged inside one of the connector units of the connector assembly.

When the connectors 5 have reached the end of the recess 36 the locking arm 30 of each connector 5 securely interlocks with the connector interface 35 by snapping upward. As the latching mechanism 7 in this position is not necessary any-more to hold the connectors 5 in the connector interface 35 the latching mechanism 7 is brought in a disengaged configuration by further pushing it forward until the applied force overcomes the first force level as then in embodiments according to the first variation the latches 12 jump out of the recesses 11 as schematically shown in FIG. 9. In embodiments according to the second variation, the first and second ramps 22, 23 interact, leading to a displacement of the counter-latch 51 in transversal (as well as axial) direction, as indicated by the dotted arrows in FIG. 15. As soon as a critical degree of transversal displacement (y-direction)—defined by the first force level—is achieved, the latches 12 jump over the counter-latches 51 to a disengaged configuration, as shown in FIG. 16. A disengaged configuration is schematically shown in FIG. 10 for the first variation of the invention (respectively FIG. 17 for the second variation) where the latches 12 are arranged in a neutral position along the levers 10. During insertion of the connectors 5 into the connector interface 35 a spring loaded ferrule 37 of each connector 5 is pressed into the body 29 of the related connector 5 against the force of a ferrule spring (not visible) arranged inside the connector. As a reaction thereof a locking element 38 arranged at the locking arm 30 is pressed against a rest 39 of the SFP-module (connector interface) 35. The force executed by this spring or, in the case of several connectors 5 the several springs, is normally larger than the force executed by the spring 28 arranged in the latching mechanism 7 of the variation shown in FIGS. 1 to 12. Therefore the spring 28 is not causing any negative effect on the connectors 5 when plugged in.

The mechanism that underlies the second variation can be best seen in FIG. 15 in combination with FIGS. 19 and 20. In FIG. 15 the latches 12 and counter-latches 51 are shown in an initial non-displaced state indicated by dotted lines as well as in a displaced state (continuous lines), the latches 12 being displaced relatively to the displacement unit 26 in x-direction, as indicated by the continuous arrow on the left side. As shown and schematically indicated by the dotted arrows, the counter-latches 51 are deflected due to the adjacent springs 28 of the levers 10 being bent and compressed, resulting in a movement of the stringer 24 relatively to the displacement unit 26. In FIGS. 19 and 20, the stringer 24 is partially clipped for illustrative purposes. As can be seen, the counter-latches 51 comprise some kind of recesses which serve as guidance 57 for the stringers 10, respectively the latches 12. As soon as a certain axial force (indicated by the continuous arrows) is applied on the stringer 24, the flybacks of the latches 12 get in contact with the frontal faces 56 of the counter-latches 51 and hence the first ramp 22 gets into contact with the second ramp 23. Due to the slopes of the two ramps 22, 23 (which in the embodiment shown are the same, but may also be different slopes), an axial movement of the latches 12 relative to the counter bearing element 54 results in an axial as well as a transversal displacement of the counter-latches 51, as indicated by the dotted arrows in FIG. 20. At a certain degree of transversal deflection—which depends on the axial force that is applied—the edges of the latches 12 jump over the edges of the counter-latches 51, as described above.

Figure 11:
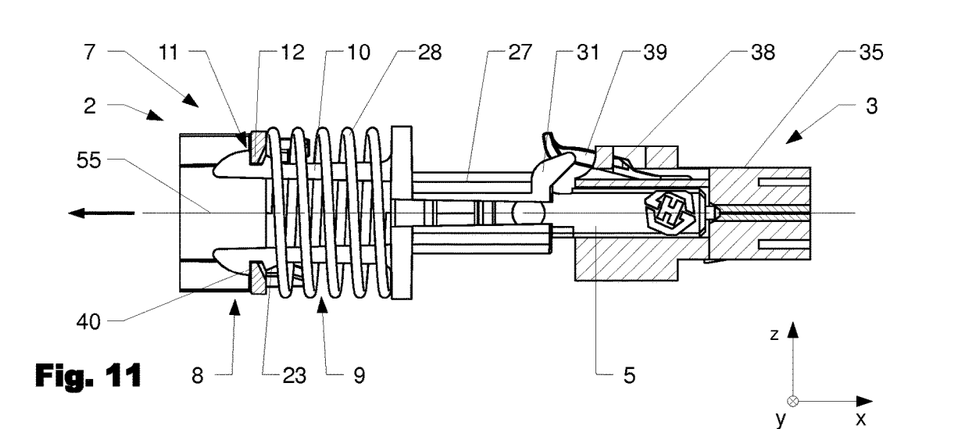
FIG. 11 shows a step in latching and unlatching of a first latching mechanism arranged inside one of the connector units of the connector assembly.
Figure 12:
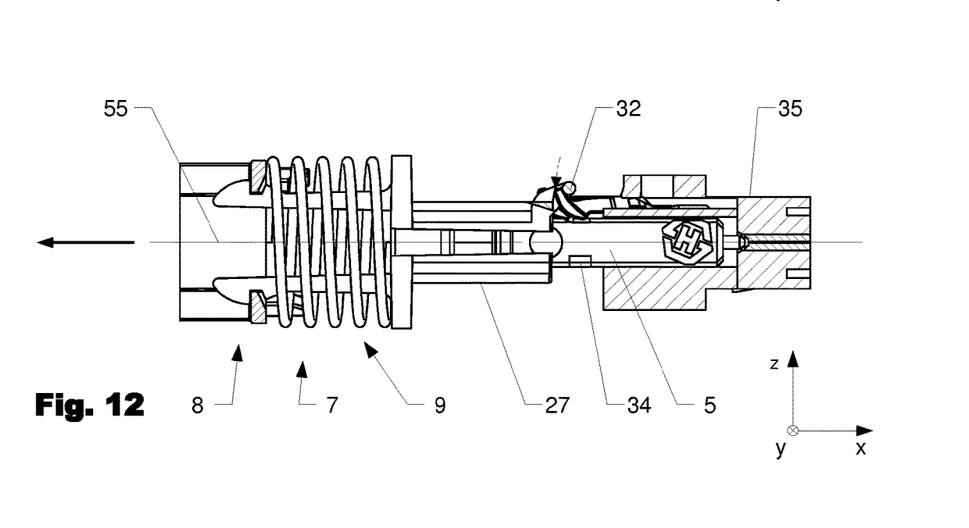
FIG. 12 shows a step in latching and unlatching of a first latching mechanism arranged inside one of the connector units of the connector assembly.
Figure 13:
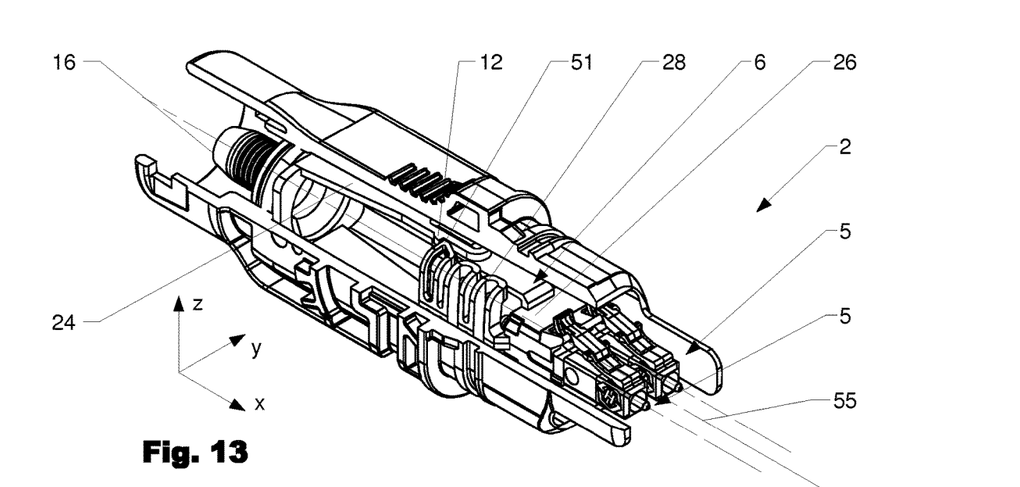
FIG. 13 a part of a second embodiment of a connector assembly in a perspective view and partially cut.

FIG. 11 and FIG. 12 are showing the disengaging of the first connector unit 2 from the second connector unit 3 for the first variation of a connector assembly, whereas FIG. 18 refers to the disengaging for the second variation. For the first variation, in a first step (FIG. 11) the latching mechanism 7 is brought into the engaged configuration by pulling the latching elements 8 over the second ramp 23 into the recess 11. The outer side of the recess 11 is delimited by a side wall 40 which is arranged perpendicular to the moving direction (x-direction) and thereby prevents that the protrusion 12 can jump out of the recess 11. Thereby it is possible when pulling further to transfer sufficient force via the engaged latching mechanism 7 to the connectors 5. Thereby the unlocking element 31 acts upon the locking arm 30 and disengages it such that the connectors 5 can be released as indicated in FIG. 12. For the second variation (FIG. 18) in a first step the latching mechanism 7 is brought into the engaged configuration by pulling the latches 12 in axial direction, such that due to an interaction between the ramps of the latches as well as the first ramps 22 of the counter-latches 51 the counter-latches 51 are temporally deflected in transversal direction (schematically indicated by the dotted arrows), allowing passage of the latches 12. After a certain movement, bolts 52 arranged at the counter bearing elements 54 interact with the end sections of elongated guide holes 53, which makes it possible when pulling further to transfer sufficient force via the engaged latching mechanism 7 to the connectors 5. Thus the connectors 5 can be disconnected, as described above.

The invention claimed is:

1. A connector assembly comprising:
   a. a plug and a socket interconnectable with respect to each other in an axial direction (x), wherein
   b. the plug comprises a plug housing to which at least one connector is operatively interconnected by a latching mechanism, wherein
   c. the at least one connector is arranged at least partially inside the plug housing and foreseen to connect to a connector interface during mating of the plug and the socket,
   d. the latching mechanism providing
      i. an engaged configuration in which the at least one connector is mechanically interconnected to the plug housing such that when the plug housing is displaced in the axial direction (x) and the at least one connector is displaced accordingly, and
      ii. a disengaged configuration in which the at least one connector is disengaged from the plug housing such that the at least one connector can be moved freely or against the force of a spring element with respect to the plug housing in the axial direction (x);
      iii. wherein in an engaged position when the at least one connector is interconnected to and interlocked with the connector interface, the at least one connector is disengaged from the plug housing, such that no negative residual forces act upon it;
      iv. wherein the latching mechanism interconnecting the plug housing and the at least one connector comprises at least one latching element arranged at or interconnected to the ply housing or the connector and at least one counter latching element arranged at or interconnected to the respective connector or plug housing, wherein
      v. the at least one latching element and the at least one counter latching element are latchable with each other.

2. The connector assembly according to claim 1 wherein the latching mechanism is configured to switch from the engaged configuration to the disengaged configuration when a force is applied which is above a first force level and the latching mechanism is configured to switch from the disengaged to the engaged configuration when a force is applied which is above a second force level, wherein the first force level is higher than the second force level.

3. The connector assembly according to claim 1 wherein the at least one connector is interconnected to the latching mechanism by a displacement unit which holds the at least one connector.

4. The connector assembly according to claim 3, wherein the displacement unit is displaceable relative to the plug housing in the disengaged configuration in axial direction.

5. The connector assembly according to claim 1 wherein the latching element comprises a latch and the counter latching element comprises a recess suitable to receive the latch.

6. The connector assembly according to claim 1 wherein the latching element comprises a latch and the counter latching element comprises a counter-latch suitable to interact with the latch.

7. The connector assembly according to claim 1 wherein the first force level is defined by a first ramp having a first slope and the second force level is defined by a second ramp having a second force level.

8. The connector assembly according to claim 7 wherein the first ramp and the second ramp include a common point of culmination.

9. The connector assembly according to claim 1 wherein the latching mechanism comprises a spring element which is loaded when the latching mechanism is disengaged.

10. The connector assembly according to claim 1 wherein the at least one connector is out of the group of the following connectors: LC, RJ45, LX.5, SC, E2000.

* * * * *